UNITED STATES PATENT OFFICE.

JULES DOUGE, OF PARIS, FRANCE.

PREPARATION OF COLLODION FOR THE MANUFACTURE OF ARTIFICIAL SILK.

SPECIFICATION forming part of Letters Patent No. 699,155, dated May 6, 1902.

Application filed March 6, 1902. Serial No. 97,000. (No specimens.)

*To all whom it may concern:*

Be it known that I, JULES DOUGE, a citizen of the Republic of France, residing in Paris, France, have invented certain new and useful Improvements in the Preparation of Collodion for the Manufacture of Artificial Silk, of which the following is a specification.

In the present state of the manufacture of artificial silk from solutions of nitrocellulose in a mixture of alcohol and ether the collodion employed is prepared from pyroxylin in two different conditions. In the one case anhydrous pyroxylin is employed, this being obtained in this state either by washing with alcohol or ether or more generally by drying it in a stove at a temperature more or less high. Is is then dissolved in a mixture of alcohol and ether, so as to obtain collodion suitable for being formed into threads of artificial silk. Pyroxylin thus obtained has the very serious defect that it can be easily exploded, and therefore involves risks during manipulation, the more so as by drying the pyroxylin to the anhydrous condition it becomes acid by the liberation by the heat of part of the nitric acid in its composition. This acidification of the pyroxylin is irregular, owing to the variations of the temperature to which it is subjected and of the time of its exposure, depending on the hydrometric condition of the atmosphere. This irregularity in the acidity of the pyroxylin causes irregularities in the character of the collodion, which are very detrimental in the manufacture of silk. The second method of producing the collodion consists in the use of a pyroxylin hydrate which after the washing after nitration contains twenty-five to thirty per cent. of water. In this hydrate condition it is used for producing collodion by the alcohol and ether solvent. The objection to this second method is that the pyroxylin containing twenty-five to thirty per cent. of water becomes partially decomposed, especially under the influence of sunlight, so that it has to be at once employed in order to produce a collodion always of the same character capable of being easily formed into threads of good quality. This defect is very serious in practice, for in certain cases, especially when there is unforseen retardation in the output of the collodion thread, it is necessary to stop the process for a time and to keep back the pyroxylin already manufactured.

In order to avoid the difficulties attending the two methods above described of producing collodion, I have made investigations which have led me to a new process, for which I now apply for a patent.

I operate in the following manner: After the washing of the pyroxylin I subject it to centrifugal action or pressure until all the water that can be extracted in this way is eliminated and without regard to the amount that may still be held by it. The pyroxylin is then exposed on screens to the open air in the shade or in a chamber having a current of air passing through it. This exposure of the pyroxylin to air is to be maintained until the average hygroscopic condition is obtained—say six to ten per cent. In this state the pyroxylin can be kept for an indefinite period in a cool place without danger of heating, acidification, or oxidation.

In moist and cold weather in order to avoid prolonging excessively the time of exposing the pyroxylin to the air, which might be practically objectionable on account of the large space which the screens would occupy, there may be sent into the drying-chamber air previously heated in a separate chamber provided with pipes for circulation of hot water or of low-pressure steam or other means of heating the air not above 25° to 30° centigrade. In this way the decomposition (even partial) of the pyroxylin is certainly provided against. I prefer, however, the heating of the air by hot water or low-pressure steam on account of the regularity and certainty which this method insures. The transformation of the pyroxylin into collodion is obtained by subjecting it to a solvent compounded in proportions suited to the quality or source of the cellulose employed for producing the pyroxylin. This solvent consists of a mixture of alcohol and ether, with the addition of an aqueous alkaline solution—such as potash, soda, ammonia, or their carbonates, lithia, lime, baryta, sodium borate, potassium or sodium silicate, or the like—which has the effect of neutralizing, as it is produced, the acid, which is always formed when the solvent of the pyroxylin, whatever it may be, evaporates, such as mixture of alcohol and ether, acetone, or acetic ether. This production of acid seriously interferes with the subsequent operations and injuriously affects the strength and durability of the artificial silk.

Having thus described the nature of this invention and the best means I know of carrying the same into practical effect, I claim—

1. The process above described for manufacturing artificial silk by means of collodion obtained by the solution of pyroxylin air dried at low temperatures until it contains six to ten per cent. of water, in a mixture compounded according to the quality of the cellulose employed of ether, alcohol and an aqueous alkaline solution (potash, soda, ammonia, or their carbonates, lithia, lime, baryta, sodium borate, potassium or sodium silicate or the like).

2. The process of preparing collodion for the manufacture of artificial silk which consists in washing pyroxylin, subjecting it to centrifugal action to eliminate water therefrom, exposing the same to a drying atmosphere until it is brought to a hygroscopic condition of about six to ten per cent., and subjecting it to the action of a mixture of alcohol, ether and an aqueous alkaline solution.

3. The process of preparing collodion for the manufacture of artificial silk which consists in washing pyroxylin, subjecting it to centrifugal action to eliminate water therefrom, exposing the same to a drying atmosphere until it is brought to a hygroscopic condition of about six to ten per cent., and subjecting it to the action of a solvent.

4. The process of preparing collodion for the manufacture of artificial silk which consists in subjecting pyroxylin to the action of a mixture of alcohol, ether, and an alkaline solution.

5. The process of preparing collodion for the manufacture of artificial silk which consists in bringing pyroxylin to a hygroscopic condition of about six to ten per cent. and subjecting it to the action of a mixture of alcohol, ether and an alkaline solution.

In witness whereof I have hereunto signed my name in the presence of two subscribing witnesses.

JULES DOUGE.

Witnesses:
   JULES ARMENGAUD, Jeune,
   MAREL ARMENGAUD, Aîne.